United States Patent [19]

Elberbaum

[11] Patent Number: 5,240,220
[45] Date of Patent: Aug. 31, 1993

[54] TV CAMERA SUPPORTING DEVICE

[75] Inventor: David Elberbaum, Tokyo, Japan

[73] Assignee: Elbex Video Ltd., Tokyo, Japan

[21] Appl. No.: 755,220

[22] Filed: Sep. 6, 1991

[30] Foreign Application Priority Data

Sep. 12, 1990 [JP] Japan .................... 2-158670

[51] Int. Cl.$^5$ .................................... F16M 13/00
[52] U.S. Cl. .................... 248/558; 248/276; 248/323; 352/243; 354/293
[58] Field of Search .............. 248/317, 323, 183, 278, 248/349, 178, 179, 558, 291, 276, 672, 674; 352/242, 243; 354/293, 294

[56] References Cited

U.S. PATENT DOCUMENTS

| | | | |
|---|---|---|---|
| 2,137,286 | 11/1938 | Herbig | 248/276 X |
| 3,305,681 | 2/1967 | Green | 248/323 X |
| 3,787,014 | 1/1974 | Story et al. | 248/558 |
| 4,097,883 | 6/1978 | Adamski et al. | 248/178 X |
| 4,160,999 | 7/1979 | Claggett | 352/243 |
| 4,533,103 | 8/1985 | Ina | 248/179 |
| 4,575,039 | 3/1986 | Persson et al. | 248/179 X |
| 4,687,170 | 8/1987 | Beaver | 248/183 X |

FOREIGN PATENT DOCUMENTS

| | | | |
|---|---|---|---|
| 2355284 | 11/1973 | Fed. Rep. of Germany | 248/276 |
| 1181311 | 2/1970 | United Kingdom | 248/558 |

*Primary Examiner*—David L. Talbott
*Attorney, Agent, or Firm*—Helfgott & Karas

[57] ABSTRACT

A TV camera supporting device to be used in a surveillance system in a building or the like includes a first supporting member receiving a TV camera fixed thereto, a second supporting member rotationally-adjustable relative to the first supporting member and connectable thereto, and a third supporting member which has an axis of rotation intersecting the axes of rotation of the first and second supporting members and is angularly rotatable about its axis of rotation to adjust a relative position between the third supporting member and the second supporting member to which the supporting member is secured after the adjustment. By adjusting the relative positions of the three supporting members, the direction of the optical axis of the TV camera can be adjusted as desired.

8 Claims, 4 Drawing Sheets

TV CAMERA SUPPORTING DEVICE

BACKGROUND OF THE INVENTION

1. Field of the Invention

The present invention relates to a supporting device of the TV camera to be mounted onto walls or ceilings, and more particularly to a supporting device of the TV camera suitable for security and surveillance systems.

2. Description of the Prior Art

It has been necessary to protect and conceal a TV camera used in conventional surveillance systems. Typically, the TV camera has been installed in a housing provided on a TV camera supporting arm. Such housing has a window pane having a hole and is formed such that the optical axis of the TV camera lens extends through the window hole.

Such a housing, which is constructed and positioned so that the optical axis line passing through the window will extend towards the place being surveyed, is fixed onto the wall, ceiling, pole, etc. of the building thereby enabling the TV camera to take images of the place or objects surveyed.

However, the direction of the axis of the camera, especially the direction of its optical axis, will differ dependent upon the relative position between the place where the camera was installed and the place of which images will be taken; therefore, the required structure of the supporting equipment for the TV camera varied substantially dependent upon the relative positions of the place where the camera be installed and the place of which an image has been taken.

The TV camera supporting equipment known hitherto has been provided with a housing in which the TV camera was accommodated. Such an equipment had to be designed and produced each time, case by case, according to the place where the camera was installed.

SUMMARY OF THE INVENTION

It is an object of the present invention to provide a TV camera supporting device which would enable to adjust the TV camera position to any desired mounting conditions.

It is another object of the present invention to provide a TV camera supporting device which can be used universally at any location at the building or outside thereof.

These and other objects of the invention are attained by a television camera supporting device comprising a first support means for supporting and receiving a television camera, the first support means having a hole enabling picking up images by the television camera; a second support means adjustably-connected to the first support means, the first support means having a first axis of rotation, the second support means having a second axis of rotation which intersects the first axis, the first axis being a central axis of the hole; the second support means being angularly rotatable about the second axis to adjust a relative position of the first and second support means; and coupling means for coupling the first and second support means to each other so that the first means is supported by the second support means, the coupling means preventing the first and second support means from relative displacement after the relative position of the first and second support means has been adjusted.

The television camera supporting device may comprise a third support means adjustably-connected to the second support means, the third support means having a third axis of rotation which intersects the first and second axes, the third support means being angularly rotatable about the third axis to adjust a relative position of the third and second support means; and fastening means for securing the second support means to the third support means such that the third support means supports the second support means, the fastening means preventing the second and third support means from relative displacement after the relative position of the third and second means has been adjusted.

Before joining the first and second support means together, the first support means is rotated relative to the second support means by a predetermined angle about the first axis, whereby the direction of the axis of the TV camera received in the first support means will be varied.

However, after the first and second support means have been secured to each other, their relative displacement is prevented by the coupling means.

According to the present invention, during the assembly of the supporting device, a number of different relative adjustable positions of the first and second support means may be obtained due to the provision on each of the support means of a set of angularly equally spaced holes which receive the coupling means, for example, screws. The second support means is rotated unless the first axis will extend in a certain direction relative to the second support means and then the first and second support means are connected to each other.

Thus, according to the invention, the direction of the axis and the angle of mounting of the TV camera in the supporting device can be adjusted at option.

The TV camera can be held in the first support means so as to enable the optical axis of the camera to coincide with the first axis.

If the third support means is provided in the device, the second support means may be angularly rotated by a predetermined amount relative to the third support means about the second axis so that the direction of the second axis line relative to the third support means will be changed. Then the second and third support means are coupled together, for example, by screws. Thereby before assembling the supporting device, the direction of the second axis relative to the third support means can be selected and then the second and third support means will be attached to each other.

The aforementioned objects, features and advantages of the invention will, in part, become obvious from the following more detailed description of the invention, taken in conjunction with the accompanying drawings, which form an integral part thereof.

DETAILED DESCRIPTION OF THE PREFERRED EMBODIMENT

Figure 1:
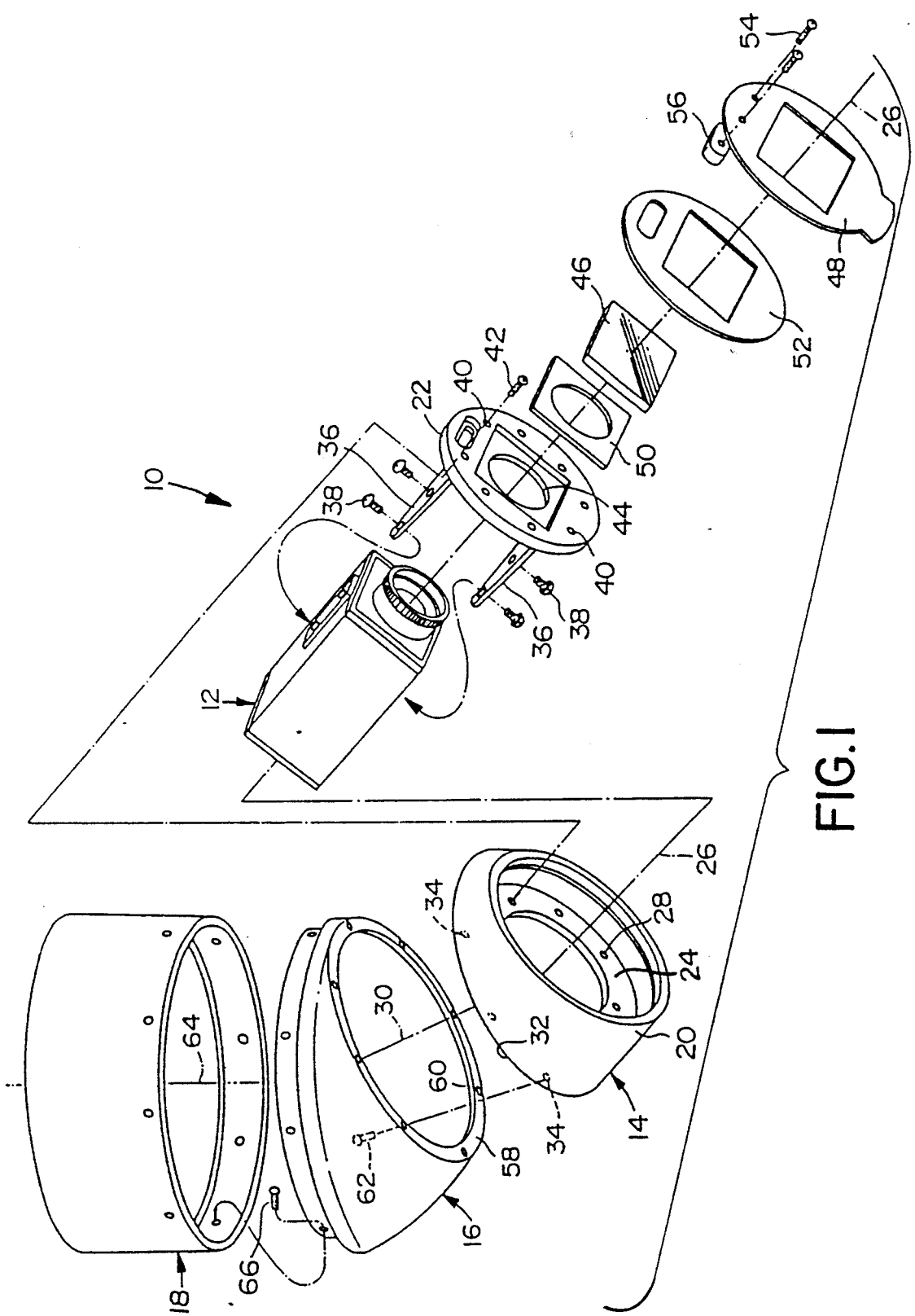
FIG. 1 is an exploded perspective view of the assembly of the TV camera supporting device according to the present invention.

Referring now to the drawings in detail, a TV camera supporting device 10, which can be mounted to a wall, a ceiling of a building or the like, includes a three-part housing, the first part of which is a first supporting member 14 which holds a TV camera 12, as will be explained in detail below. First supporting member 14 has a central axis 26 about which it can be rotated. The supporting device 10, in which TV camera 12 is accommodated, further includes a second supporting member 16 which has a central axis 30 and a third supporting member 18 having a central axis 64. All supporting members 14, 16 and 18 are rotational bodies, each adapted to rotate about its respective central axis. Supporting member 18 is of cylindrical configuration. After adjusting the direction of the axis of the TV camera and thus its objective lens axis, as will be explained below, supporting members 14, 16 and 18 are fastened to each other by screws 34, 62 and 66, respectively.

The first supporting body 14 has an outer portion 20 and an inner element 22. Outer portion 20 has an inwardly radially extending annular flange 24 which forms a recess 25 (FIG. 3) which receives substantially circular disk-shaped holding element 22 which has a plurality of angularly spaced-apart holes 40 which correspond to holes 28 provided in the annular flange 24 and spaced from each other at the intervals corresponding to those of holes 40. Holes 28 are formed along a circumference coaxial with the central axis 26 of supporting member 14. Holes 40 and 28 receive screws 42 which secure plate element 22 to the flange 24 of supporting member 14.

Integrally with disk-shaped element 22, are formed two parallel legs 36 extending outwardly from the disk-shaped element 22. Legs 36 enclose TV camera 12 at both lateral sides thereof and are secured thereto by screw 38. The so-assembled TV camera together with the holding element 22 is inserted into an opening 27 of the supporting member 14 inwardly of the housing. B rotating the disk-shaped element 22 about axis 26 relative to the outer portion 20, different holes 28 come to register with different holes 40 whereby relative angular position of elements 22 and 20 can be changed. As the TV camera 12 assembled on the holding element 22 is fixed to supporting member 14 by screws 42 its optical axis, specifically the axis of its objective lens, extends along central axis 26 of supporting member 14.

Figure 2:
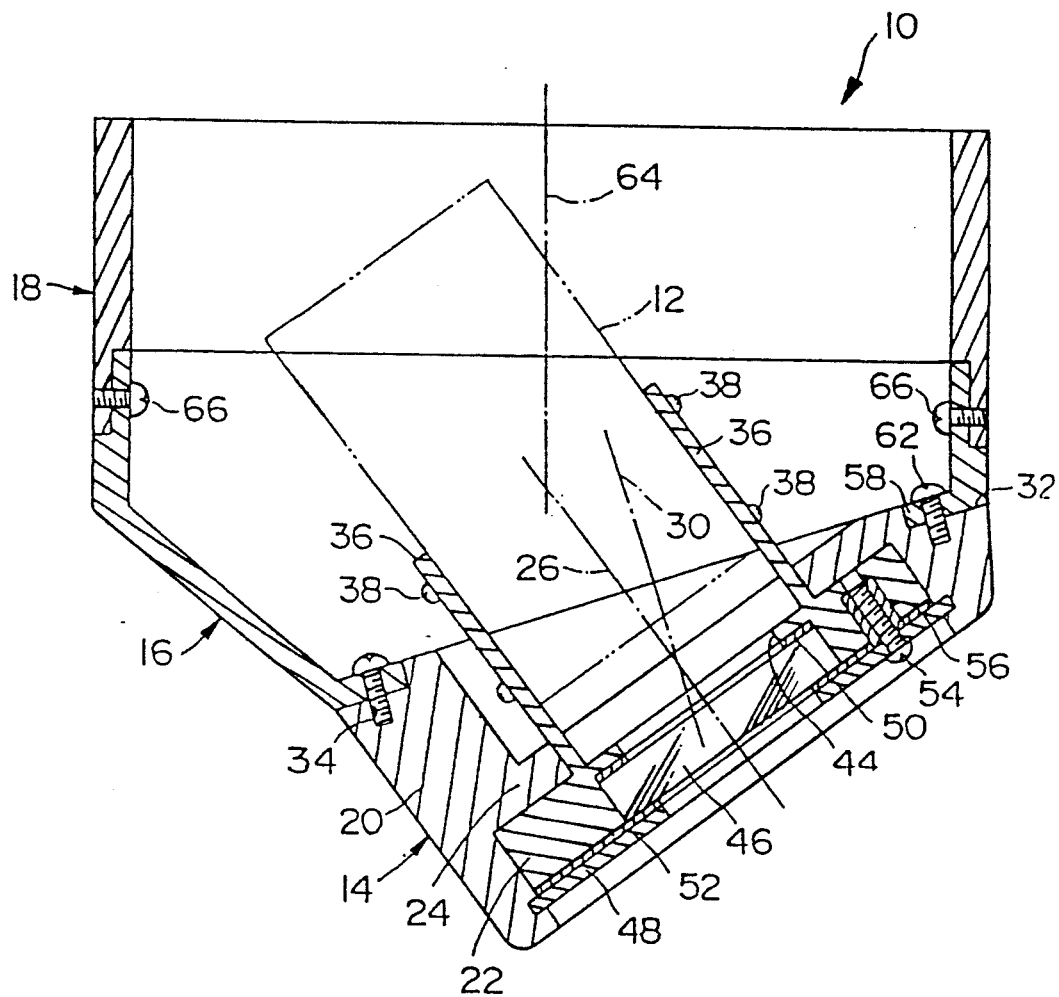
FIG. 2 is a sectional view through the assembly of FIG. 1 in a first relative position of the supporting members of the supporting device.
Figure 3:
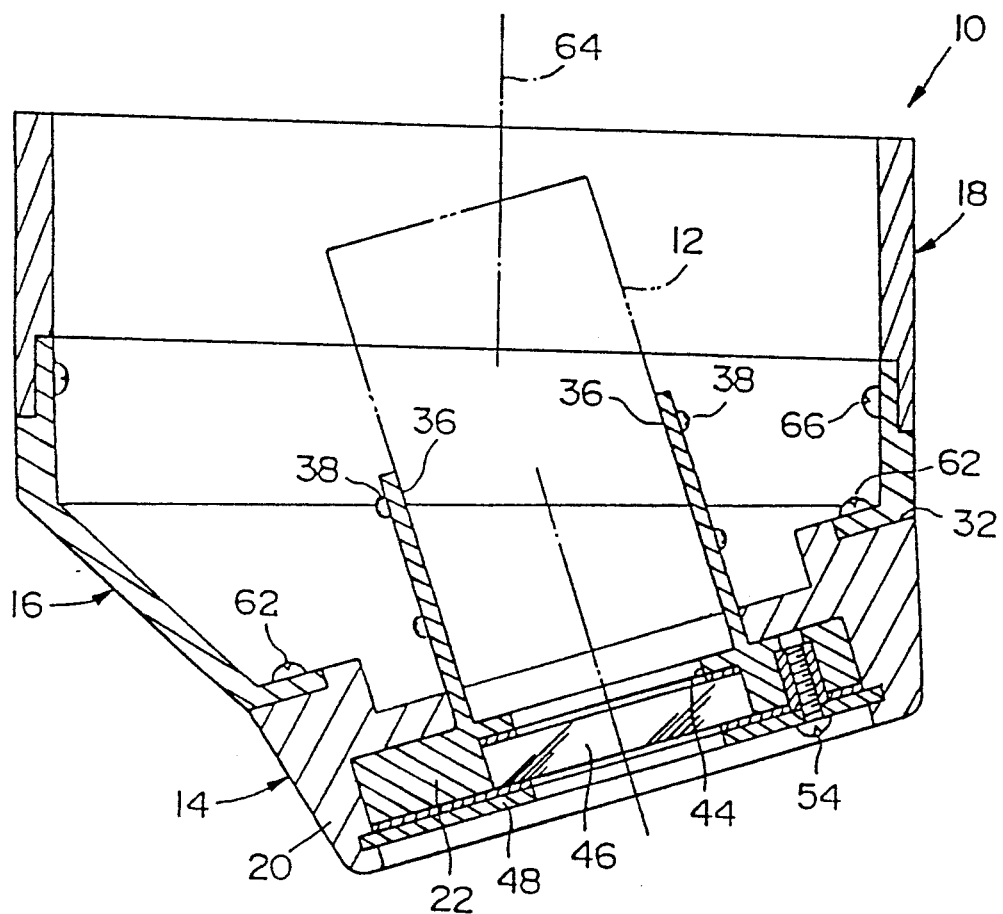
FIG. 3 is a sectional view of the assembly of FIG. 1, in a second relative position of the supporting members of the device of the present invention.
Figure 4:
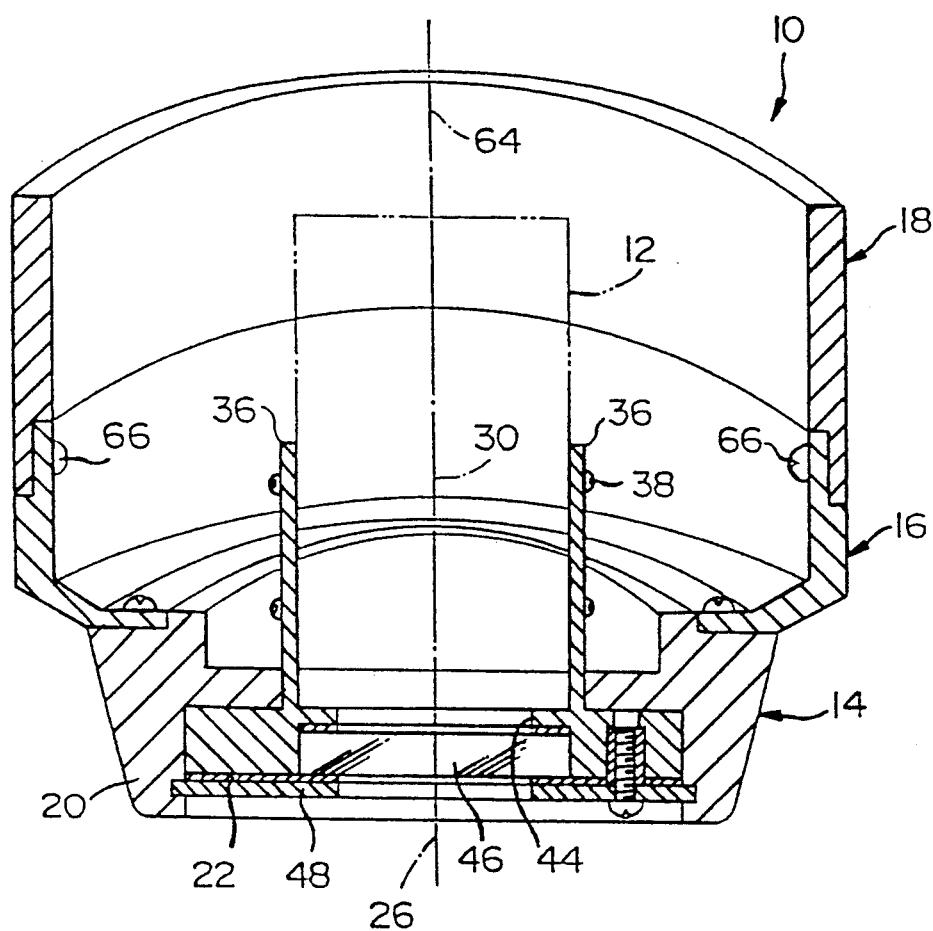
FIG. 4 is a sectional view of the assembly of FIG. 1 in a third relative position of the supporting members.

As can be seen in FIGS. 2-4, at the inner end face of the outer portion 20 of supporting member 14, is formed a stepped part 32 which is rotation-symmetrical relative to an axis 30 which includes an acute angle with axis 26. Stepped part 32 receives an inwardly radially extending flange portion 58 of the second supporting member 16 which can be rotated about axis 30. Flange portion 58 is provided with a plurality of circumferentially spaced holes 60 which are spaced from each other at the intervals corresponding to those of holes 34 provided in the stepped portion 32. Holes 60 and 34 receive screws 62 to fix second supporting member 16 to the first supporting member 14. Before these two supporting members 14, 16 are secured to each other their relative position can be changed by rotation or angular displacement of support member 16 about axis 30. Three different relative positions of the two supporting members are shown in FIGS. 2, 3 and 4. The first and second supporting members 14, 16 while being able to rotate relative to one another, before they are secured to each other by screws 62, are prevented from relative displacement once they have been fastened together.

Disk-shaped element 22 has a circular central hole 44 which is used as a window for TV camera 12 to take images. Hole 44 is closed with a plate 46 of transparent material inserted into the disk-shaped element 22. Plate 46 is prevented from falling out from outer portion 20 of supporting member 14 by means of a setting plate 48 tightly set in a recess provided in outer portion 20.

A seal or packing 50 is inserted between an inner flanged portion 51 which forms hole 44 and the inner end face of plate 46. A second seal or packing 52 is placed between setting plate 48 and the outer end face of holding element 22. Setting plate 48 and both packings 50, 52 have respective central openings to enable TV camera 12 to take images.

Plate 46 of transparent material and packing 50 are of rectangular configuration and are respectively positioned in recesses of rectangular cross-section formed in the disk-shaped element 22 whereby packing 50 and transparent plate 46 are prevented from rotation about axis 26 relative to the outer portion 20 of the supporting member 14.

Outer portion 20, setting plate 48 and packing 52 which is of circular configuration are also prevented from relative displacement about axis 26 by means of a key 56 fixed by screws 54 to the setting plate 48.

The third supporting member 18 is cylindrical and has an axis of rotation designated at 64 which includes with each of axes 30 and 26 an acute or obtuse angle. At the lower end thereof, the third supporting member 18 is provided with a plurality of holes 65 angularly spaced from each other by the intervals corresponding to those of holes 67 formed in an upwardly extending cylindrical portion 69 of the second supporting member 16 insertable into the third supporting member 18. Third supporting member 18 is rotatable about axis 64 relative to the cylindrical portion 69 of the second supporting member 16 and, after adjusting their relative angular position, the two supporting members 16, 18 are fastened together by screws 66.

In the position of FIG. 2, all axes 64, 30 and 26 intersect each other; in the position of FIG. 3 axis 64 intersects axes 26 and 30 which extend in the same direction and in the position of FIG. 4, axes 64, 30 and 26 extend in the same direction. The surface confronting the first and second supporting members is at the right angle with axis 64 and intersects axis 30.

The supporting device 10, for example, can be assembled in the following order:

a) TV camera 12 is mounted to legs 36 of the disk-shaped holding element 22;

b) the outer portion 20 is fixed to holding element 22 with the TV camera fixed thereto;

c) transparent plate 46, setting plate 48 and packings 50, 52 are fixed to element 22;

d) the first and second supporting elements 14, 16 are joined together; and e) the second and third supporting members 16, 18 are joined together after adjustment of their relative position if necessary.

In the assembly, the TV camera 12 would be accommodated in the space formed between the first and second supporting members 14, 16. Accordingly, the first and second supporting members 14, 16 in the assembled condition will form the housing for the TV camera 12.

The supporting device 10, as assembled above, can be mounted to a wall with its third support. However, it is also possible to mount the second supporting member 16, without using the third supporting member 18, directly to the structure of the buildings.

The directions of the optical axis of TV camera 12 and the axis 26 will be determined by means of adjustments, before fixing the supporting members with screws 62 or 66, of the relative positions of the first and second supporting members 14, 16 by rotating about axis 30 or of the second and third supporting members 16, 18 by rotating about axis 64.

In the assembled states of the supporting device shown in FIGS. 3 and 4, the relative position of the elements 20 and 22 has been adjusted by rotating about axis 26, and, at the same time, it has been ensured that the scanning direction is at the right angle relative to the TV camera 12.

As seen from FIG. 3, supporting member 14 has been rotated by 90° about axis 26 relative to the second supporting member 16 from the position of FIG. 2. As seen from FIG. 4, supporting member 16 has been rotated by 90° about axis 30 relative to supporting member 18 from the position of FIG. 2.

It is possible to adjust the directions of the optical axis of TV camera 12 and axis 26 by means of the adjustments of both, the relative position of the first and second supporting members 14, 16 by rotating about axis 30, and the relative position of the second and third supporting members 16, 18 by rotating about axis 64.

It should be understood, of course, that the foregoing disclosure relates to only a preferred embodiment of the invention and that it is intended to cover all changes and modifications of the example of the invention herein chosen for the purpose of the disclosure, which modifications do not constitute departures from the spirit and scope of the invention.

What is claimed is:

1. A television camera supporting device comprising:
   a first support means for supporting and receiving a television camera, said first support means having a hole enabling picking up images by the television camera;
   a second support means adjustably-connected to said first support means, said first support means having a first axis of rotation, said second support means having a second axis of rotation which intersects said first axis, said first axis being a central axis of said hole, said second support means being angularly rotatable about said second axis to adjust said first and second support means in a plurality of relative positions; and
   coupling means for coupling said first and second support means to each other so that said first support means is supported by said second support means in any of adjusted relative positions thereof, said coupling means preventing said first and second support means from relative displacement after a desired relative position of said first and second support means has been adjusted,
   said first support means comprising means for holding said television camera such that an optical axis of the television camera coincides with said first axis,
   said holding means being rotatably adjustable within said first support means about said first axis so as to adjust a position of the television camera in said first support means.

2. A television camera supporting device as claimed in claim 1, wherein said first and second support means are fitted to each other.

3. A television camera supporting device as claimed in claim 2, wherein said first and second support means having annular faces which face each other and intersect said first axis at a non-right angle thereto and are perpendicular to said second axis to continuously extend around said second axis, said first and second support means abutting against each other at said annular faces.

4. A television camera supporting device as claimed in claim 1, wherein said coupling means includes a plurality of screws for coupling said first and second support means in said plurality of relative positions defined by said rotating at equal angular intervals about said second axis, said screws being inserted through an inner side of said second support means and being inaccessible from an outer side of said first and second support means in assembly.

5. A television camera supporting device as claimed in claim 1, wherein said first and second support means constitute in assembly with each other a housing for receiving said television camera.

6. A television camera supporting device as claimed in claim 1, further comprising:
   a third support means adjustably-connected to said second support means, said third support means having a third axis of rotation which intersects said first and second axis, said third support means being angularly rotatable about said third axis to adjust a relative position of said third and second support means; and
   fastening means for securing said second support means to said third support means such that said third support means supports said second support means, said fastening means preventing said second and third support means from relative displacement after the relative position of said third and second means has been adjusted.

7. A television camera supporting device as claimed in claim 5, wherein said first and second support means are fitted to each other.

8. A television camera supporting device as claimed in claim 1, wherein said holding means includes a circular member supported in said first support means and having said hole, and two spaced-apart parallel legs holding said television camera and being attached to said circular member and extending into an interior of said second support means.

* * * * *